United States Patent
Whitney et al.

(10) Patent No.: US 11,831,122 B2
(45) Date of Patent: Nov. 28, 2023

(54) FREE ELECTRON LASER ORBITAL DEBRIS REMOVAL SYSTEM

(71) Applicant: BNNT, LLC, Newport News, VA (US)

(72) Inventors: R. Roy Whitney, Newport News, VA (US); David R. Douglas, Yorktown, VA (US); Henry P. Freund, Vienna, VA (US); George R. Neil, Williamsburg, VA (US)

(73) Assignee: BNNT, LLC, Newport News, VA (US)

( * ) Notice: Subject to any disclaimer, the term of this patent is extended or adjusted under 35 U.S.C. 154(b) by 0 days.

(21) Appl. No.: 17/902,406

(22) Filed: Sep. 2, 2022

(65) Prior Publication Data
US 2023/0006412 A1   Jan. 5, 2023

Related U.S. Application Data

(62) Division of application No. 16/770,203, filed as application No. PCT/US2018/064398 on Dec. 7, 2018.

(Continued)

(51) Int. Cl.
  *H01S 3/09*   (2006.01)
  *H01S 3/08*   (2023.01)
  *H01S 3/23*   (2006.01)

(52) U.S. Cl.
  CPC ............. *H01S 3/08* (2013.01); *H01S 3/0903* (2013.01); *H01S 3/2308* (2013.01)

(58) Field of Classification Search
  CPC ........ H01S 3/08; H01S 3/0903; H01S 3/2308; B64G 1/68; B64G 3/00
  See application file for complete search history.

(56) References Cited

U.S. PATENT DOCUMENTS

| | | | | |
|---|---|---|---|---|
| 5,297,152 A | * | 3/1994 | Dattoli | H01S 3/0903 372/2 |
| 6,285,690 B1 | * | 9/2001 | Kim | H01S 3/0903 372/2 |

(Continued)

FOREIGN PATENT DOCUMENTS

| EP | 3 163 320 | 5/2017 |
|---|---|---|
| WO | 2018/148286 | 8/2018 |

OTHER PUBLICATIONS

Godlove et al., "High-Power Free-Electron Lasers Driven by RF Linear Accelerators", Particle Accelerators, vol. 34, pp. 169-187, 1990 (Year: 1990).*

(Continued)

*Primary Examiner* — Xinning (Tom) Niu
(74) *Attorney, Agent, or Firm* — Joshua B. Brady; Nixon & Vanderhye, P.C.

(57) ABSTRACT

Orbital debris removal (ODR) systems under the present approach may use a ground- or surface-based FEL and mirror system with sufficient power and both spatial and temporal resolution to both locate Category II OD (1 cm to 10 cm diameter) in low Earth orbit (LEO, 160 to 2000 km altitude) and remove these objects from orbit. Locating the Category II OD is performed by having the light beam from an FEL and its beam director scan a volume of space of interest and then observing the light reflected from the OD. Removing the OD may include heating the OD to a sufficiently high temperature to evaporate the OD, changing the orbit of the OD such as to lower the perigee, or both. Megawatt-class MOPA FELs for, inter alia, removing OD, are described.

14 Claims, 9 Drawing Sheets

Related U.S. Application Data

(60) Provisional application No. 62/596,499, filed on Dec. 8, 2017, provisional application No. 62/680,858, filed on Jun. 5, 2018, provisional application No. 62/724,893, filed on Aug. 30, 2018.

(56) References Cited

U.S. PATENT DOCUMENTS

| | | |
|---|---|---|
| 2016/0307659 A1 | 10/2016 | Nanni et al. |
| 2017/0093113 A1* | 3/2017 | Musumeci ............ H01S 3/0959 |
| 2017/0237225 A1* | 8/2017 | Nikipelov ............. H01S 3/0903 |
| | | 372/2 |

OTHER PUBLICATIONS

International Search Report and Written Opinion of the ISA for PCT/US2018/064398, dated Apr. 22, 2019, 17 pages.

Phipps et al., "Removing Orbital Debris with Lasers", Lawrence Livermore National Laboratory, Aug. 15, 2011, 39 pages.

Godlove et al., "High-Power Free-Electron Lasers Driven by RF Linear Accelerators", Particle Accelerators, vol. 34, pp. 169-187.

* cited by examiner

FREE ELECTRON LASER ORBITAL DEBRIS REMOVAL SYSTEM

CROSS REFERENCE TO RELATED APPLICATIONS

This application is a Divisional of application Ser. No. 16/770,203, filed Jun. 5, 2020, which is a U.S. national phase of International Application No. PCT/US2018/064398 filed Dec. 7, 2018, which claims to the benefit of U.S. Provisional Patent Application No. 62/596,499, filed Dec. 8, 2017, U.S. Provisional Patent Application No. 62/680,858, filed Jun. 5, 2018, and U.S. Provisional Patent Application No. 62/724,893, filed Aug. 30, 2018. The contents of each are expressly incorporated by reference in their entirety.

STATEMENT REGARDING GOVERNMENT SUPPORT

None.

FIELD OF THE INVENTION

The present disclosure relates to free electron lasers and the removal of orbital debris with free electron lasers.

BACKGROUND—INTRODUCTION

Orbital debris removal (ODR) by a variety of high power lasers has been considered for several decades. Proposed embodiments typically have the lasers in orbit or on the ground, and a few embodiments have considered utilizing orbiting relay mirrors to deliver the laser power. Most of the lasers suggested utilize high flux pulses, typically less than 10 nanoseconds in length, that deliver sufficient flux to the surface of the orbital debris (OD) that some of the debris evaporates from the surface thereby providing pulses of thrust to the OD. Multiple pulses are utilized to sufficiently alter the OD's orbit that the OD is burned up in the atmosphere on subsequent orbit, possibly years later. Free electron lasers (FELs) have been considered as one of the options for lasers. For example, in the mid 1990s NASA considered them with project Orion, but consideration of FELs has been much less than other forms of lasers because FELs until now have had insufficient average power and/or insufficient pulsed power for most options and the innovations required for successful implementation were not developed. For example, NASA's project Orion and similar projects did not appreciate how the combination of average power, pulsed power, frequency and time control could be used to locate OD and then remove the OD. If anything, the conventional art discounted FELs for ODR.

One of the biggest challenges for ODR is the ability to locate Category II OD with diameters in the 1 to 10 cm range. (Category I is OD<1 cm and Category III is OD>10 cm.) OD with diameters greater than approximately 10 cm can be located and tracked by ground- or surface-based radar. With approximately 400.000 Category II OD items in low earth orbit (LEO), defined as 160 to 2000 km in altitude and with a large number of satellites operating in the LEO range, there is great interest in finding an efficient solution to both locate the Category II OD items and remove them. Prior ODR solutions have been ineffective at dealing with Category II OD.

Very high average power FELs, i.e., generally average power (sometimes referred to as CW power for continuous wave power) in excess of about 10 kW, have been demonstrated only recently, at the U.S. Department of Energy's Thomas Jefferson National Accelerator Facility (Jefferson Lab), which produced a beam of 14 kW at a 1.6 micron wavelength in 2006. Jefferson Lab achieved this performance level using an electron beam with an average current of 10 mA resulting in a performance of 1.4 kW average photon beam power per mA of average beam current. No very high average power FEL has surpassed the 14 kW average photon beam power that Jefferson Lab achieved. Higher average power photon beams are produced by multiple versions of solid state and gas lasers. However, these lasers typically do not have the diffraction limited beam quality that an FEL output photon beam can achieve, and they typically only operate at a narrow range of wavelengths or a single wavelength (where FELs can operate over broad ranges of wavelengths).

High capital cost and operating expenses of prior technologies have limited the deployment of FELs. Examples include: the need to have significant amounts radio frequency (RF) capacity installed to provide the power for the very high levels of electron beam current required and to deal with microphonics in the cryogenic components that are compensated for by extra installed RF; the need to operate at 2 K, superfluid Helium temperature, rather than 4 K, atmospheric pressure liquid helium temperature, where refrigeration is much less expensive; and the need to manage waste heat from coherent synchrotron radiation (CSR) and transition radiation (TR) due to the very high levels of electron beam current projected to be required to achieve high average photon beam power.

Most FEL development for over a decade has been focused on x-ray FELs with the goal of producing very high peak power, e.g. above a terawatt, for very short durations, e.g. below a picosecond, for scientific experiments. The XFEL is now turning on at DESY, in Germany and the LCLS-II is under construction at SLAC at Stanford, California A number of the enhancements needed for the very high peak power x-rays could in principle be applied to very high average power FELs, but these innovations and developments have not been done for very high average power.

What is needed, then, is a very high average beam power FEL, capable of operating at wide wavelength ranges with controllable beam structure for use in ODR systems and other very high average beam power applications.

SUMMARY

This disclosure relates to FEL ODR systems and methods, such as ground- or surface-based FEL and mirror systems and methods with sufficient power and spatial and temporal resolution, to both locate Category II OD and remove such objects from orbit. Embodiments of the system can also remove Category I OD and some smaller Category III OD, though the embodiments described herein are generally optimized for Category II OD. Locating the Category II OD under the present approach may be performed by having the light beam from an FEL and its beam director scan a volume of space of interest, and then observing the light reflected from the OD. FELs can emit a stream of sub-picosecond pulses at any repetition rate up to the radio frequency (RF) that is utilized to power the electron bunches in the FEL. The pattern of the light pulses and the travel time of the pulses and their reflections may then be used in the present approach to optimize signal-to-noise in detecting the light reflecting from the OD. For example, the pattern of light pulses, and/or the frequency modulation of the light beam, may be varied in the transmitted light. A separate mirror may be utilized to detect the light reflected from the OD, and may detect the pattern variations for additional improvement in the signal-to-noise ratio.

The present approach also provides for removal of OD. Generally, the process of OD removal involves heating the OD to a sufficiently high temperature to evaporate the OD, preferentially heating the Earth-facing side of OD even while rotating, such that the evaporation from the Earth-facing side provides thrust on the OD. The thrust changes the orbit of the OD and lowers the perigee. Some embodiments of the present approach may include combinations of these aspects. The optics of beam director mirror(s) may be arranged such that the apparatus can switch from a scanning mode to directed energy (DE) mode, in which the light beam is concentrated on an instance of OD.

This disclosure also relates to an optimized MOPA FEL system that generates very high average power (i.e., average power above about 10 kW), and therefore are ideal for ODR applications. Embodiments may include an electron source with an average electron current below about 1 mA per 10 kW of average photon beam power, as well as an electron booster, an electron accelerator, an electron beam transport system, two undulators, and a photon beam, in a MOPA FEL configuration. A single electron beam with at least dual energies may be used to feed both an undulator in an OSC configuration and an undulator in an AMP configuration. Alternatively, correlated energy spread from injector timing manipulation or subharmonic cavities can be utilized, and as a further alternative the initial electron beam may be differentially amplified to separate it into two beams that separately feed the OSC and AMP undulators and are then recombined. The AMP undulator may be a tapered undulator. In some embodiments, a tapered undulator may provide for extreme transverse compression of the electron beam from a strong FODO lattice. An electron beam stop may be included to provide energy recovery of the post undulator electron beam. The resultant performance in terms of average photon beam power per unit of average electron beam current is more than a factor of 10 above what has been achieved to date, and the performance can reach 30 times and above what has been achieved to date. In addition, the efficiency for converting electrical power to photon power is a factor of 3 to 10 higher than what contemporary technologies have achieved to date. The present approach advantageously provides for a combination of the lower beam currents required and improvements in vibration management at cryogenic temperatures that drive the amount of RF required. Additional improvements may be achieved by operating the cryogenic system at 4 K rather than 2 K, and from utilization of advanced beam stop technology.

Embodiments of the present approach may take the form of methods for free electron laser (FEL) orbital debris removal. A light beam may be emitted from an FEL to a beam director. The light beam may have light pulses and a diffraction-limited portion. Either or both of the light pulse pattern and the frequency modulation of the light beam may be varied, such as to improve the signal-to-noise ratio in the subsequent detection of reflected light. The light beam may be directed from the beam director, such as a mirror, to a search region, such as a region of space to be scanned for orbital debris. Light reflected from orbital debris may be detected at an observation mirror. When the emitted light includes variations, the reflected light will include at least one of a reflected light pulse pattern and a reflected modulated frequency. Orbital debris may be identified in the search region, such as through detection and analysis of the reflected light. For example, reflected light pulse patterns and/or reflected modulated frequencies may be used in the analysis of reflected light to improve the signal-to-noise ratio, and identify orbital debris in the search region. One or more orbital parameters for the orbital debris may be determined, and the light beam may be redirected to the orbital debris for removal. For example, in some embodiments the emitted light beam may be focused for a narrow field projection, such as to specifically target the orbital debris.

Some embodiments may include tracking the identified orbital debris with a broad field projection light beam. In some embodiments, the emitted light beam may be a broad beam having a cone opening angle of at least 0.05 milliradians and less than 2.0 milliradians, and more preferably and more preferably from about 0.3 to about 1.0 milliradians. However, the opening angle for broad field projection depends on the elevation being scanned, and unless otherwise stated the present approach is not limited to a specific opening angle in the broad field projection for scanning and locating OD.

In some embodiments, directing the light beam at a search region may be performed by, for example, using a first mirror having a broad field projection for scanning and tracking, and re-directing the light beam at the orbital debris may be performed by using a second mirror. Re-directing the light beam at the orbital debris in some embodiments may involve focusing a waist of the diffraction-limited portion of the light beam at the orbital debris. In some embodiments, switching between the first mirror and the second mirror may be performed at a rate sufficient to maintain the OD within a field of projection of the light beam.

In some embodiments of the present approach, the FEL is a MOPA FEL. Embodiments of a MOPA FEL may include, for example, an electron source, such as an electron source with an average electron beam current below about 2 mA and above 1 microamp per 10 kW of average photon beam power, and the electron source may preferably have an emittance less than 4 mm mrad and above 1 micrometer mrad, an energy spread less than one part in one hundred. The MOPA FEL may also include an electron booster, an electron accelerator, an OSC undulator, and an AMP undulator. The MOPA FEL may in some embodiments include one or more of a boron nitride nanotube (BNNT) cryosorber and a BNNT vibration damper. It should be appreciated that various AMP and OSC undulators may be used, depending on the embodiment, for example, the AMP undulator may be a tapered undulator or a non-tapered undulator. In some embodiments, the OSC undulator and/or the AMP undulator may be one of a planar undulator and a helical undulator. The AMP undulator may be, in some embodiments, a planar undulator having a non-tapered portion. In some embodiments, the OSC undulator and/or the AMP undulator is a helical undulator. It should be appreciated that various combinations of undulators may be used, apart from the specific combinations disclosed herein. In some embodiments, the MOPA FEL includes SRF cavities incorporating a boron nitride nanotube vibration damper.

In some embodiments, the MOPA FEL is a Compact MOPA FEL. Light may be generated from a Compact MOPA FEL by, for example, splitting an accelerated into a first split electron beam and a second split electron beam, passing the first split electron beam through an AMP undulator, passing the second split electron beam through an OSC undulator generating an OSC light beam, amplifying the OSC light beam in the AMP undulator to generate the emitted light beam, and passing the first split electron beam after the AMP undulator and the second electron split beam after the OSC undulator through a combiner, deaccelerating the first split electron beam and accelerating the second split electron beam in the secondary accelerator to form a combined electron beam, and passing the combined electron beam through the primary accelerator for energy recovery.

Embodiments of the present approach may take the form of FEL orbital debris removal systems. Systems may include, for example, a MOPA FEL, preferably having average power above about 10 kW and configured to emit a light beam having light pulses. At least a portion of the light beam may be a diffraction-limited portion. Embodiments may further include a light pulse pattern and frequency modulation controller, a beam director configured to receive the emitted light beam and re-direct the emitted light beam to a search region, a scanning mirror with a broad field projection and a removal mirror having a narrow field projection, an observation mirror configured to detect a reflected light beam from the search region, and an orbital debris identification controller configured to identify an orbital debris in the search region from at least one of the reflected light pulse pattern and reflected modulated frequency, and provide at least one scanning mirror orbital debris orbital parameter. The reflected light beam may have, for example, a reflected light pulse pattern and reflected modulated frequency, which may be used to improve signal-to-noise ratio. In some embodiments, the beam director may be configured to switch between the scanning mirror and the removal mirror. Some embodiments of an FEL orbital debris removal system may include a MOPA FEL with an average beam power of at least about 100 kW, and in some embodiments the MOPA FEL may include an average power of at least about 1 MW.

Some embodiments of the FEL orbital debris removal system include a Compact MOPA FEL. Embodiments of a Compact MOPA FEL may include, for example, an electron beam splitter directing a first split electron beam through an AMP undulator and a second split electron beam through an OSC undulator, and an electron beam combiner after the AMP undulator and the OSC undulator with an output electron beam arc to a primary accelerator for energy recovery. The OSC undulator may have an output light beam path feeding an input light beam path of the AMP undulator. In some embodiments, the FEL has at least one of a BNNT cryosorber and a BNNT vibration damper.

Some embodiments of the present approach may take the form of a master oscillator/power amplifier (MOPA) free electron laser (FEL). In some embodiments, the FE, has an electron source with an average electron beam current below about 2 mA and above 1 microamp per 10 kW of average photon beam power, and in some embodiments the electron source has an emittance less than 4 mm mrad and above 1 micro m mrad, an energy spread less than one part in one hundred. Embodiments of an FEL may include an electron booster, an electron accelerator, an OSC undulator having an output light beam path, and an AMP undulator with an input light beam path connected to the OSC undulator output light beam path, and an output emitted light beam path. In some embodiments, the FEL has at least one of a BNNT cryosorber and a BNNT vibration damper.

Embodiments of a MOPA FEL may include different combinations of undulators. For example, an AMP undulator may be a tapered undulator and/or a non-tapered undulator. The OSC undulator and/or the AMP undulator may be a planar undulator. In some embodiments, the AMP undulator may be a planar undulator with a non-tapered portion. In some embodiments, the OSC undulator and/or the AMP undulator may be one of a planar undulator and a helical undulator. The present approach is not intended to be limited to the combinations of undulators set forth in the specific examples disclosed herein. Some embodiments may include one or more SRF cavities having a BNNT vibration damper.

In some embodiments, the FEL may include an electron beam splitter with a first split electron beam arc connected to the AMP undulator and a second split electron beam arc connected to the OSC undulator, and an electron beam combiner after the AMP undulator and the OSC undulator with an output electron beam are connected to a primary accelerator. Such configurations may be especially useful for energy recovery. In some embodiments, the OSC undulator includes an output light beam path feeding into the AMP undulator, which in turn emits a light beam.

DETAILED DESCRIPTION

Described herein are embodiments of FEL ODR systems and methods capable of average power, peak power light pulses, and temporal and spatial resolution combinations, to both locate and remove OD, and particularly Category II OD in some embodiments. Category II OD typically has diameters in the 1 to 10 cm range. Category I is OD<1 cm and Category III is OD>10 cm. As will be appreciated by those of ordinary skill in the art, embodiments of an FEL ODR system under the present approach can also remove OD in Category I and Category III. A variety of FEL formats are possible, including Oscillator (OSC) FEL as used for the Jefferson Lab 14 kW FEL, Self-Amplified Spontaneous Emission (SASE) FEL which operates as an Amplifier (AMP) of noise, Regenerative Amplifier FEL (RAFEL), Master Oscillator/Power Amplifier (MOPA) FEL, and optical klystron FEL.

Figure 1:
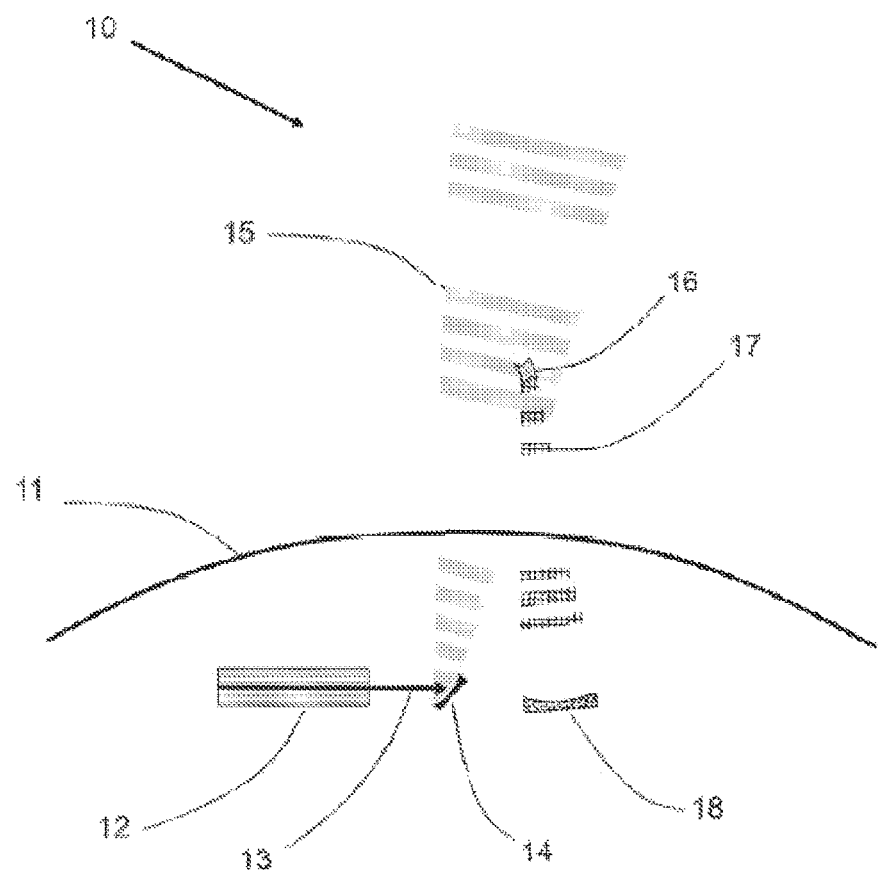
FIG. 1 illustrates an embodiment of the present approach in which FEL locates OD by beaming light into a scanned region of space, and the system detects reflected light.

FIG. 1 illustrates an embodiment of an FEL ODR system 10 located on the surface of the Earth 11. The system may be used to locate OD 16. The FEL 12 is, in this embodiment, a megawatt class FEL so as to have sufficient power to fill a scanned region of space with enough light to detect the OD 16. Megawatt (MW) class generally means that the FEL can produce at least about 1 MW of average power or more for periods of at least about one second, where average power will be considered the total energy delivered for a period of one second. In preferred embodiments of the present approach, the total period of 1 MW average power performance lasts for at least hours, and more preferably the period lasts for days, and preferably with only brief, e.g. less than about 30 minutes, time with the FEL 12 off during the performance period. It should be appreciated that those of ordinary skill in the art may select the FEL class appropriate for a particular embodiment and may deviate from preferred embodiments described herein. Novel methods to create megawatt class FEL suitable for preferred embodiments are described in below and in the incorporated references. The diffraction limited light beam 13 from the FEL 12 is directed to the beam director 14. Beam director 14 may include one or more mirrors transporting the light beam 13 to a primary mirror beam director (not shown), as may be known in the art. While in principle beam director 14 can direct the light beam 13 in any direction, some embodiments of the present approach configured for ODR from the surface Earth 11 preferably cover a cone of about 20°, and in some embodiments up to about 45°, in all directions with respect to the zenith. Embodiments may deviate from these directions, as needed.

A demonstrative ODR embodiment with the parameters in Table I will be utilized for an illustrative example. The parameters are illustrative only and it should be appreciated that a wide range of parameters that utilize the characteristics of this FEL based ODR system can be used.

TABLE 1

Illustrative FEL ODR Parameters

| | | |
|---|---|---|
| FEL power | 1 | MW |
| FEL light beam wavelength | 400 | nm |
| FEL RF frequency | 750 | MHz |
| FEL electron beam emittance | 1 | mm-mrad |
| Primary mirror diameter | 3 | m |
| Peak elevation of OD | 800 | km |
| Diameter of scanned region at Peak | 0.5 | km |
| Opening angle of broad beam cone | 0.6 | milliradians |
| OD diameter | 2 | cm |
| OD reflectivity | 0.2 | |
| OD average emissivity | 0.2 | |
| OD rotation | 50 | % |
| Atmospheric transmission | 80 | % |
| Observation mirror diameter | 10 | m |
| Mirrors' angular resolutions | 0.3 | micro-rad |
| Category II OD objects | 400,000 | in LEO |
| Goal: min Category II OD removed | 20,000 | objects/year |

During operation, light beam 15 from the beam director 14 expands to create a broad beam to fill a broad scanned region of space approximately in the shape of a cone above the beam director 14 that creates a broad scanning and tracking region. As used in this description, a broad field/beam typically has the opening angle of the cone from 0.1-1.0 milliradians, though in some embodiments the opening angle of the cone may be beyond this range. For example, the broad field opening angle may be from about 0.05 to about 2.0 milliradians, and more preferably from about 0.3 to about 1.0 milliradians. However, it should be appreciated that the opening angle for broad field projection is necessarily dependent upon the target elevation being scanned, and the present approach is therefore not limited to a specific opening angle in the broad field projection for scanning and locating OD. The cone shape depends on the particular embodiment and may be an oval or similar shape. Using the exemplar values in Table 1 and the length of shortest track of a piece of OD traversing the scanned region at approximately 70% of the diameter of the scanned region, the area being scanned at a peak elevation of 800 km is 0.15 $km^2$ and the cone opening angle is near 0.6 milliradians. In some embodiments of the present approach, the full altitude range being scanned is from 160 km to 2000 km. The total LEO volume is 1.29E12 $km^3$ so the average Category II OD density is 3.1E-7 Category II OD/$km^3$. The density of OD is non-uniform with altitude with a peak near 800 km altitude and a much lower secondary peak near 1,450 km altitude. At present, over two-thirds of the Category II OD is between 600 km and 1.000 km. For LEO, there is relatively little OD below 400 km and relatively little above 1.600 km. OD at 800 km takes 100.87 minutes to orbit Earth at a speed of 7.45 km/s. This results in a piece of OD taking about 58 milliseconds (or slightly longer) to transit the cone being scanned at the 800 km altitude.

Embodiments of an FEL 12 according to the present approach may be configured to produce sub-picosecond long light bunches by utilizing electron bunches that can be at any rate and distribution up to full RF frequency of the FEL 12. In the illustrative embodiment, this is up to 750 MHz, but those having ordinary skill in the art will appreciate that the full RF frequency depends on the particular FEL. It takes 6.1 milliseconds for the light beam 15 from the primary mirror beam director 14 to transit the 2000 km–160 km=1.840 km of the distance in LEO at the zenith and up to 8.7 milliseconds if the light beam 15 is at a 45° angle to the zenith. If all of the electron bunches in the FEL 12 are all filled, then there are 6.5E6 bunches of light in the light beam 15 going through LEO at 45° to the zenith. A small percentage of the light pulses, for example 1-10% of the light pulses, can be turned off in a controlled fashion by not injecting or otherwise modulating 1-10% of the electron bunches in the FEL or other means. Typically, this is done by modulating the light output of the drive laser for the electron source. In the example embodiment, the pattern can be repeated every 20 milliseconds or longer, where the 20 milliseconds number is picked to be slightly more than twice the longest LEO transit time of the light beam 15. The result is that there would be 1.5E5 missing light pulses in the 1.5E7 available pulses during the 20 milliseconds. The distribution of these missing pulses may be varied such that they produce detailed information on the location of the OD 16 for the light reflected 17 from the OD 16 by monitoring the time-of-flight (TOF) of the light pulses in the light beam 15, from (a) when they leave the primary mirror beam director 14, until (b) they are observed at an observation mirror telescope 18 from reflections from the OD 16. The distance between two light pulses in the light beam 15 is typically 0.4 meters and will be multiples of this value if there are missing light pulses. This means that the distance of the OD 16 to the primary mirror beam director 14 and observation mirror telescope 18 can be determined to at least the accuracy of about 0.4 meters by utilizing TOF as is known in the art. Further, with the observation mirror telescope's 18 angular resolution of 0.3 micro-rad, the translational location accuracy of the OD is 0.24 m at zenith and 0.34 m at 45° to zenith for the 800 km altitude for this example embodiment. The general preference for the angular resolution of the observation mirror telescope is to match or be better than the apparent angle of the waist of the focus of the light beam 15 at the altitude of the OD 16. Consequently, the orbital parameters of OD 16 can be measured with excellent accuracy as OD 16 is tracked across the area of observation. This, in turn, means that if the OD 16 is not removed during the path on which it was first observed, the OD 16 can be located on a subsequent orbit by only having to scan a volume of characteristic dimensions of 10 m or less. In general, both the primary mirror beam director 14 and the observation mirror telescope 18 need to be able to track the OD 16. This means that both are preferably capable of scanning +/−45° to the zenith within about 215 seconds of transit time for OD 16 at 800 km. For OD at 160 km altitude the time is reduced to about 41 seconds, and the time is about 580 seconds for OD at 2000 km altitude.

For the 800 km altitude demonstrative embodiment, it takes about 58 milliseconds for OD to transit the light beam 15 with an average length of scan of about 0.43 km. The corresponding area of the scan as indicated above is about 0.15 km$^2$. Assuming that all the Category II OD is at 800 km, this results in 2.3E-10 of the Category 11 OD being observed. Consequently, the fraction of the 400,000 Category IT OD observed during the 58 milliseconds is 9.3E-5 Category II OD objects being observed. This results in it taking about 621 seconds (10.3 minutes) on average to observe a piece of Category 11 OD assuming sufficient light is detected. This rate equates to 50,800 Category II OD objects being detected per year. Assuming that the system is on 90% of the time and that rotations of the Category II OD results in only 50% of the OD being detected, then an estimated 22,900 OD objects will be detected per year meeting the goal as indicated in Table I. Due to the peaking in OD 16 at the 800 km altitude, this estimate is approximate within +/−25% or somewhat higher.

Using the 1 MW FEL 12 of the example embodiment, 46,000 J of light beam 15 energy is directed to the 0.5 km diameter area at 800 km altitude during the 58 milliseconds. Assuming the 0.8 transmission through the atmosphere, a reflectivity of 0.2 of the 2 cm diameter Category II OD 16, then 2.6E-10 of the light beam 15 is in the reflected light 17. Assuming 0.8 transmission of the reflected light 17 back through the atmosphere, and assuming that this light is spread uniformly over an area with a radius of 800 km on the Earth, with the 10 m diameter observation mirror telescope 18 there is a net return of 8.0E-21 of the light that started from the FEL 12. This equates to 3.7E-16 J of energy, or 2,300 eV. At 400 nm light in the example embodiment, this is 741 photons. In embodiments of the present approach the observation mirror telescope 18 system will have a filter to select the approximately 0.1% bandwidth of 400 nm light produced by the FEL 12. Assuming this is 90% efficient and that the photon detector is 50% efficient, then the number of photons detected will be 334 per transit of 2 cm Category II OD at 800 km. If 1 cm diameter Category II OD 16 had been considered, then 83 photons would be observed for the 1 cm Category 11 OD 16 at the altitude of 800 km. Additionally, these values assume a uniform distribution of the light beam 15 over the area and a corresponding uniform distribution of the reflected light beam 17 of the area back on Earth. Including non-uniform distributions would further increase the signal-to-noise considerations of the detected light in the observational mirror telescope 18.

While the number of photons detected is not large, they have distinct signatures for OD. As indicated above, the observational mirror telescope 18 will have the combined spatial and temporal resolution to determine the position to approximately 0.4 m in both altitude and in direction of motion. The first signature for OD 16 is that the observed photons are all at an altitude that varies a few 10 s of meters at the most and less than a few meters in most instances. For example, at 800 km the OD 16 is observed for a distance of slightly less than 0.5 km in the example embodiment while an orbit is a distance of over 45,000 km. Even if the OD 16 orbit is somewhat elliptical, there will only be the indicated small variations in altitude for this short portion of the orbit.

The second signature for OD 16 is that the photons appear as a roughly Gaussian distribution across the light beam 15 during the time of the transit. The field-of-view of the observational mirror telescope 18 is set to be slightly larger than the size of the light beam 15 so the Gaussian distribution is approximately centered in the field-of-view. The observational mirror telescope 18 system needs to be close enough to the FEL 12 and primary mirror beam director 14 that the field-of-view of the observation mirror telescope 18 overlaps with the light beam 15 but the two systems do not need to be immediately adjacent to each other. The third signature for OD 16 is that the photons that match the first two signatures also match the time distribution of light pulses in the light beam 15 produced by the FEL 12. The fourth signature is that the wavelength of the observed light in the observation mirror telescope system 18 must match the wavelength of the FEL 12. There are enhancements that can be added to this technique in some embodiments. For example, the FEL 12 is capable of operating as a power amplifier driven by a more conventional laser master oscillator. In such a situation, the wavelength of the FEL's 12 light beam 13 can be frequency modulated in time to create an additional signal signature. The FEL 12 output bandwidth of the light beam 13 is then also governed by the very narrow master oscillator signal. Heterodyne detection may be used for locking in on the detected photons in the observation mirror telescope 18 and potentially even deriving velocity information from the OD 16. Having a heterodyne light beam 15 will provide increased signal-to-noise for the detection of smaller OD 16 or OD 16 that is the furthest away from the primary mirror beam director 14.

For locating OD 16, the primary mirror beam director is preferably capable of altering its focal properties to control the field of projection of the light beam 15. As those of ordinary skill will appreciate, this can be accomplished by changing the distances of the optical elements within the beam director or swapping the optical elements, among other methods as may be known in the art. The same is the case for the observation mirror telescope 18 so that its field-of-view has the overlap indicated with the light beam 15. During the targeting period if the light beam is being spread over an angular range to fill the scanned region. Because this spread in angle, the non-diffraction limited portions of the light beam will contribute to the amount of light filling the scanned region. Those of ordinary skill in the art of FELs should be familiar, FELs can deliver over 80%, and usually higher, as diffraction limited light. While the targeting of OD does not require diffraction limited FEL light, the targeting can utilize the diffraction limited FEL light, and ODR does require the diffraction limited FEL light.

Figure 2:
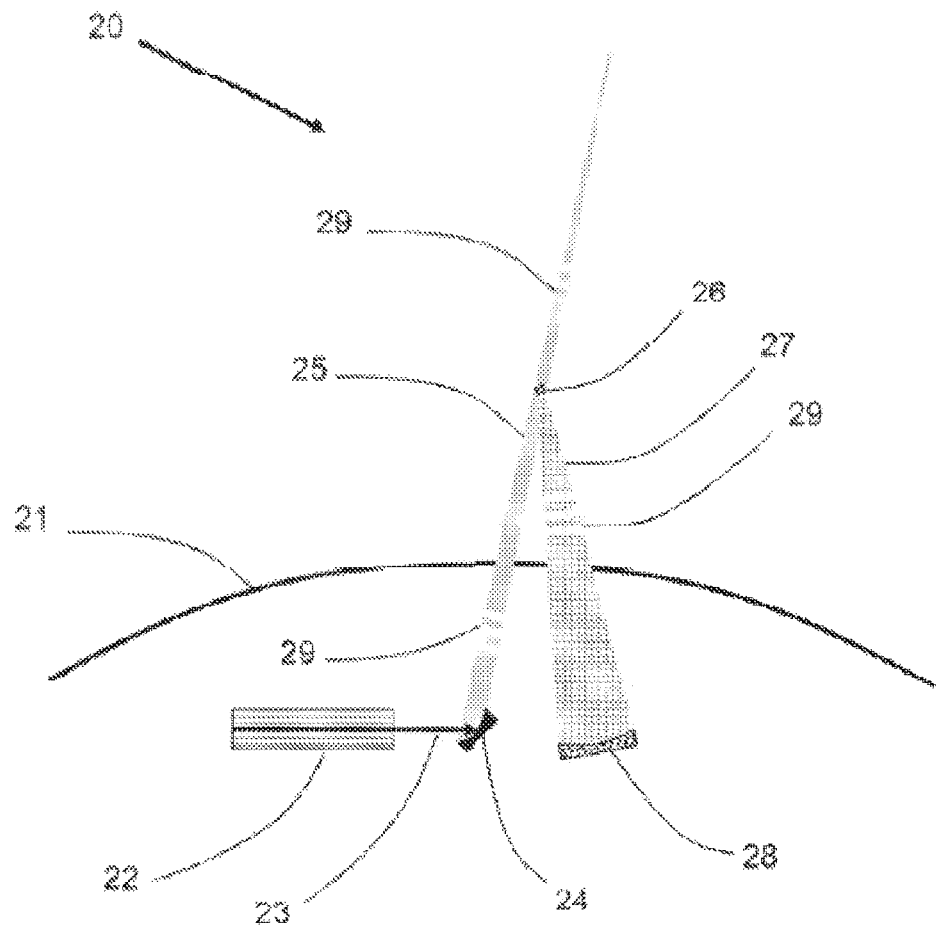
FIG. 2 illustrates FEL removal of OD by beaming light onto the OD and monitoring the reflected light according to an embodiment of the present approach.

Once the OD 16 has been detected such that its orbital parameters are known to within about a few meters position, the optics for the focus and direction of the primary mirror beam director 14 are switched or adjusted from the broad tracking and scanning region to cover an area with characteristic length dimension of less than 5 m as seen in FIG. 2. In some embodiments, the switching or adjustment may be made in less than a second, the key point being that the switching or adjustment needs to be fast enough to keep the OD in the field of projection of the light beam for continued observation and this time may vary some with the altitude of the OD. In some embodiments, two or more primary beam directors 14 may be utilized and a switching mirror, not shown, may be used to direct the beam from a smaller diameter beam director or beam directors, not shown, utilized for the initial broad angle projection and scanning to a larger diameter beam director that can provide the tight focusing for narrow projection of the light beam 15 for the next steps. As used in this description, a narrow field projection, which produces a narrow beam, typically has the opening angle that produces a diffraction limited waist in the beam at a chosen elevation, i.e. a waist as small as possible with the only limitations being diffraction and atmospheric disturbances, if present. The smaller primary beam director mirror 14 may be less than 1 cm in diameter for some embodiments, though for managing the power density on the mirror, a diameter in the region of 5 to 20 cm may be preferred, especially in the embodiments where an intermediate diameter primary mirror with of the light beam 15 is utilized to aid in locating the OD 16. In these embodiments, the thousand-fold decrease in linear dimension translates to a million-fold increase in intensity of the light beam 25 on the OD 26. Within a second, the position is then known to a characteristic length dimension of 0.4 m or better. By tracking the orbital debris to this precision during the time of observation, the orbital parameters are determined, to typically include one or more of apogee, perigee, semi-major axis and its orientation, eccentricity, mean motion and period. For example, a CPU may be used to run one or more algorithms that calculate or estimate one or more of apogee, perigee, semi-major axis and its orientation, eccentricity, mean motion, period, among other potential orbital parameters as may be used in the art. It should be appreciated that suitable algorithms may be developed by those having at least an ordinary skill in the art, and the present approach is not intended to be limited to any particular methodology for calculating orbital parameters. There are options at this point that may be used in embodiments of the present approach; either (1) the system may further concentrate the intensity of the light beam 25 on the OD 26, such as, for example, by additional adjustments in the focus of the primary mirror beam director, or (2) continue to track the OD 26, such as to even better determine its orbit and/or improve the precision of the orbital parameters. It should be appreciated that those of ordinary skill in the art may select either or both options, depending on the objectives for a given embodiment. Concentrating light beam 25 intensity may be used to target and remove OD 26, and results in a narrow field projection. As should be appreciated by those having ordinary skill in the art, narrow field projection produces a narrow beam. Narrow beam parameters depend on the particular embodiment, as well as the orbital parameters of the targeted OD, and preferably the beam has an opening angle that produces a diffraction limited waist at a target distance relative to the system. In an ideal scenario, the narrow beam has a waist as small as can be achieved at the OD's location (e.g., distance from the beam source). In some embodiments, diffraction and atmospheric disturbances, if present, may be factored into the narrow field projection as necessary. Depending on the details of the ranges involved and orbital parameters, for example, the focus of the light beam 25 will result in a narrow field/beam with a diffraction limited waist in the diameter of the light beam 25 at the distance of the OD 26. Typically, smaller OD 26 objects will be removed immediately, while larger OD 26 objects will be removed on subsequent orbits above the surface of Earth 21.

To remove the OD 26 by vaporization or orbit adjustment by preferential Earth facing partial vaporization, the primary mirror beam director 24 may be adjusted to produce a diffraction limited waist condition at the location of the OD 26. In the example embodiment, the 3 m primary mirror beam director 24 system can produce a 26 cm diameter diffraction limited beam waist in the light beam 25 at 800 km altitude. The primary mirror beam director 24 may, in some embodiments, include adaptive optics (AO) to achieve this small size utilizing feedback from the observation mirror telescope 28 system. With the FEL 22 operating at 1 MW and including the atmosphere transmission of 0.8, the result is 1.6 kW/cm$^2$ delivered to the OD 26 at 800 km altitude. Assuming that the OD's 26 emissivity is the same as the OD's 26 absorption and ignoring radiative and vaporization cooling, the resultant temperature of the OD 26 will reach the vaporization temperature of the OD 26 when it is heated over the range of angles indicated from the zenith. These assumptions are reasonable for many materials utilized for satellites, and in addition, variations of up to +/−50% will not greatly affect the results for removing the OD 26.

Vaporizing aluminum requires approximately 30 kJ/g and vaporizing iron required approximately 50 kJ/g to be absorbed. Assuming the detection of the OD occurs at zenith and is heated from zenith to 30 degrees away from zenith, the flux from the light beam 25 drops from 1.6 kW/cm$^2$ to 1.2 kW/cm$^2$ for the altitude of 800 km in the illustrative example. Using the average and the transit time of 62 seconds minus 2 seconds for discovery and fine location, and the 0.2 reflectivity of the OD 26, a net 65 kJ/cm$^2$ is absorbed by the OD 26. If this is insufficient to vaporize the OD 26, the heating of the OD 26 will produce black body radiation, and some embodiments of the present invention may be configured to observe such radiation by the observational mirror 28 system and the orbit parameters of the OD 26 will be well characterized. On a subsequent orbit when the OD 26 passes over the primary mirror beam director 24, the OD 26 can be heated for at least twice as long. In this situation, as the orbit of the OD 26 is well known. OD 26 can be located even further out from the 30 degrees from the zenith and heated for a period even more than twice as long.

Although embodiments of the present approach may be employed during any time, it is expected that OD 26 location may be preferably performed at night so as to optimize signal-to-noise. However, once the OD's orbit is known, the light beam 25 can be sufficiently concentrated to observe the OD 26 in daylight, and then further concentrated to remove the OD 26. Consequently, the system 10 as shown in FIG. 1, and system 20 as shown in FIG. 2, can run continuously.

The parameters of the example embodiment with the OD 16 being located at 800 km altitude can be adjusted to optimize for other altitudes, as should be appreciated by those of ordinary skill in the art. For example, at the 404 km average altitude of the International Space Station (ISS). OD 16 as small as 0.5 cm diameter will generate about 397 photons if the maximum range of scanning is lowered to 0.1 km. While there is not a large amount of OD 16 at the altitude of 404 km, the priority to protect the crew and resources of the ISS can justify scanning for smaller OD 16 and removing it. Similarly, the parameters of the embodiment may be optimized for other altitudes. Another optimization can be the wavelength chosen for the light beam 13. In general, shorter wavelengths result in smaller mirrors and longer wavelengths result in better transmission through the atmosphere. The optimal wavelength can be selected for the locations selected for the FEL 12 and observation mirror telescope 18 on the Earth 11. In some embodiments, the wavelength may purposely be selected to be visible to the human eye so that people have the added protection of being aware of the light beam 15 in some embodiments.

The average power level of the FEL 11 light beam 12 was set to 1 MW in the example embodiment. The average FEL 11 power can range from 100 kW for removing some OD 16 to above 1 MW or as high as the beam generating technology supports. The technology disclosed in U.S. Provisional Patent Application No. 62/680,858, filed Jun. 5, 2018, and U.S. Provisional Patent Application No. 62/724,893, filed Aug. 3, 2018 (which are incorporated by reference in their entirety), describe embodiments of megawatt class power level FELs. The size of the FEL 11 does not necessarily increase as the power level goes above 1 MW, but additional power supplies may be required and the character of the electron source in the FEL 11 may change. Additional discussion of these aspects for going above 1 MW are not discussed in this disclosure so that this disclosure does not become export controlled.

As one of ordinary skill in the art should appreciate, there is great flexibility in the detailed design of the free electron laser, optical mirror systems, optical detector systems and associated information process and control systems. The examples provided serve to guide the exposition of the concepts. The methods described in the present approach may be embodied in other specific forms without departing from the spirit or essential characteristics thereof. It should be appreciated that numerical values used herein may be approximate, and unless specifically stated, persons of ordinary skill in the art should appreciate that such values are generally not intended to be finite limitations or definitive values. The disclosed embodiments are therefore to be considered in all respects as illustrative and not restrictive by the foregoing description.

Also described herein are embodiments of an MOPA FEL system that generates very high average power (e.g., output photon average power above about 10 kW). Average power as referenced herein is determined by integrating the total photon output energy for a time period of 1 second. The average electron beam current as referenced herein used in the MOPA FEL to generate the very high average power is determined by measuring the total electrical charge that is generated in the electron source, to be discussed, that enters the booster, to be discussed, for a time period of 1 second. These averages are used to distinguish from peak powers and peak currents associated with electron bunches to be discussed that are typically shorter in time than one picosecond and may even be shorter than 100 femtoseconds in some embodiments. Embodiments disclosed herein provide an average electron current above about 1 microamp and below about 5 mA per 10 kW of average photon beam power, and some embodiments may achieve an average electron current above about 1 microamp and below 2 mA per 10 kW of average photon beam power.

Figure 3:
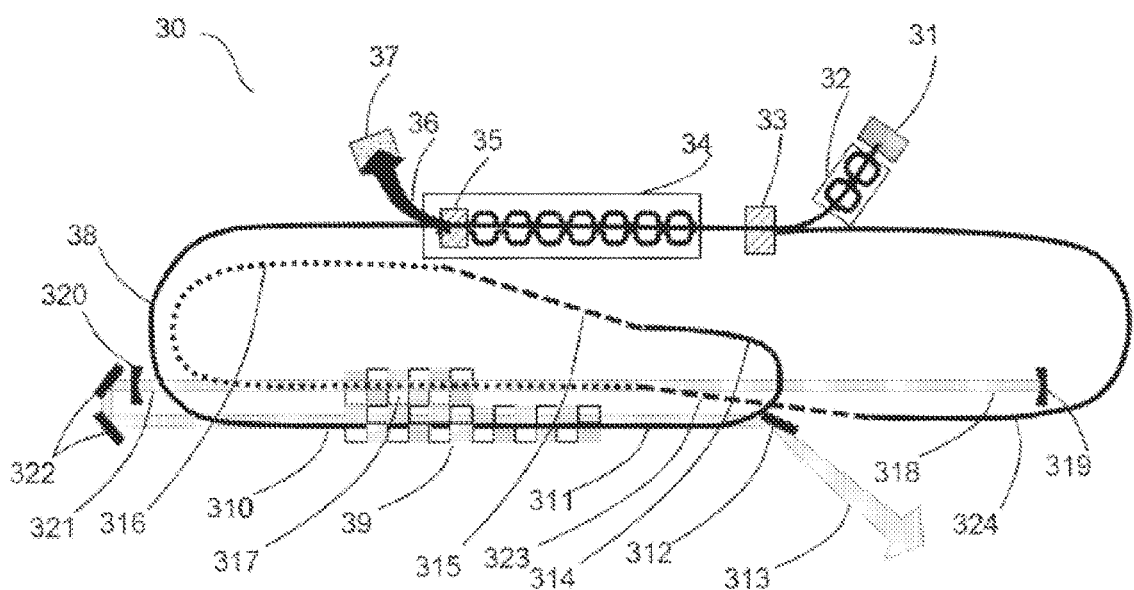
FIG. 3 illustrates an embodiment of a MOPA FEL with Parallel Axes Photons with Energy Recovered Circulating Linac at Intense Powers (PAPERCLIP) architecture.

FIG. 3 illustrates a MOPA FEL 30 according to an embodiment of the present approach. MOPA FEL 30 includes an initial portion having an electron source 311, booster 312, electron beam merge 313, and accelerator 314. The electron source 311 generates electron bunches typically at an energy of about 50 to about 500 kV, though in some embodiments the energy may be outside this range. Electron sources are typically characterized as being DC, meaning that the source operates at a fixed high voltage, or RF, meaning that the source operates at a radio frequency, RF. In addition, sources typically operate either at room temperature or at superconducting temperatures. Generally, any electron source may be used in the present approach. Ideally, though, the electron source satisfies four conditions: 1) generates electron bunches that produce the required average current, 2) generates electron bunches that are at the frequency or subharmonic of the frequency of the booster 32 and accelerator 34 frequencies, 3) preferably has a normalized electron beam emittance between 1 nm mrad and 4 mm mrad, and 4) produces electron bunches with a width in time that can be tuned by the electron beam optics to produce the width in time needed by the electron bunches when they reach the undulators 39 and 317 so as to optimize the overlap, to be discussed, of the electron bunches and the optical bunches in the undulators 39 and 317.

The booster 312 and accelerator 314 have radio frequency cavities whose electromagnetic fields accelerate, and in some embodiments also deaccelerate, the electron bunches from the electron source. The RF frequencies may range from about 10 MHz to about 10 GHz, but may fall outside of this range. For an optimized very high average power MOPA FEL producing photons in the ultraviolet (UV) to infrared (IR) and, in some embodiments ranging from the extreme ultraviolet (EUV), the RF frequencies are typically between 500 MHz and 1.500 MHz, though in some embodiments they may be outside of this range. The frequency of RF in the booster 312 may be either the same as the frequency of the accelerator 314, or in some embodiments the booster 312 RF may be an integral subharmonic of the accelerator 314 RF. And in some embodiments, there may be RF supplied to the booster 312 at an integral superharmonic of the accelerator 314 for the purpose of enhancing the compression of the electron bunches. Depending on the embodiment, as those with ordinary skill in electron sources know, the booster and accelerator RF cavities may be room temperature, may be superconducting RF (SRF), or may be a combination of the two. The frequency of the electron bunches supplied by the electron source 311 may be any subharmonic or multiple subharmonics and structured patterns of the booster 312 frequency to include a single bunch of electrons in some embodiments up the full frequency of the booster 312. The pattern of the light pulses, the travel time of the pulses and their reflections, may be used to improve signal-to-noise ratio in detecting light reflected from the OD. One or more patterns, and/or the frequency modulation of the light beam, may be varied in the transmitted light. The pattern variation may be controlled by a controller, such as a computer system with a CPU programmed to perform variations. The variations may be incorporated into detection algorithms, such that a detection mirror may detect the variations in reflected light. The controller may then implement one or more algorithms to improve the signal-to-noise ratio. In addition, the electron bunches may have a macro structure frequency such that any number of electron bunches can form a macro pulse. When the accelerator 314 is linear, it may be referred to as a linac. The energy gain of the electrons in the booster 312 is typically about 0.5 MeV to about 10 MeV, but may fall outside of this range in some embodiments. The function of the booster 312 is to accelerate the electron bunches to sufficient energy such that that they can be accelerated by the accelerator 314 without intolerable degradation of beam quality before delivery to the undulators. The accelerator 314 energy may range from about 1 MeV to about 20 GeV, but can fall outside of this range for some embodiments. The energy of the accelerator 314 may be chosen to produce photon beams of required wavelength as those of ordinary skill in FELs are aware. As examples, electron beam energy is typically in the 20 to 200 MeV range for infrared photon beams and the electron beam energy is typically in the 2 to 20 GeV range for x-ray beams. In some embodiments utilizing SRF, the booster 312 may be included in the initial section of the accelerator in a combined cryomodule, where the cryomodule is the overall vacuum and cryogenic container of the SRF cavities.

Most work on very high average power FELs in the range from EUV to IR has involved three FEL concepts but each has run into limitations: 1) OSC FELs require mirrors that typically must reflect five to twenty times the optical power that is extracted from the undulator. For example when the Jefferson Lab FEL delivered 14 kW extracted beam power, there was 140 kW of optical beam power in the optical cavity. When extracted beam powers reach over 200 kW there is currently no mirror technology to contain the OSC optical beam power and have it interact with the electron beam in the undulator, and achieve extraction of a diffraction limited beam. There may be ways to partially address this issue with very short Rayleigh range optics but this option has not been fully explored or demonstrated. 2) SASE FELs lose the overlap of the electron beam and the optical beam bunches due to the slippage that occurs from the electrons having a longer path length in the undulator and from traveling below the speed of light. This can be overcome if the bunch charges are high enough but this means bunch charges must be very high. For example, typically nanocoulomb level bunch would be required to achieve very high average powers. While nanocoulomb bunches have been produced at relatively low repetition rates, e.g. kHz scale, they have not been published as being produced at hundreds of MHz for sustained periods of time, e.g. minutes, hours, etc. at the high beam quality required. Additionally, the microbunching instabilities have not been adequately understood and addressed to be able to deliver the required electron beam emittances to the SASE AMP undulator, i.e., the undulator known in the art used in amplifier-type FELs. And, 3) the RAFEL arrangement has the same problem as the SASE FEL in that the optical pulse extracted from the AMP undulator does not sufficiently overlap with electron bunch in the AMP undulator to get the output efficiency desired for very high average power EUV to IR configurations.

Figure 4:
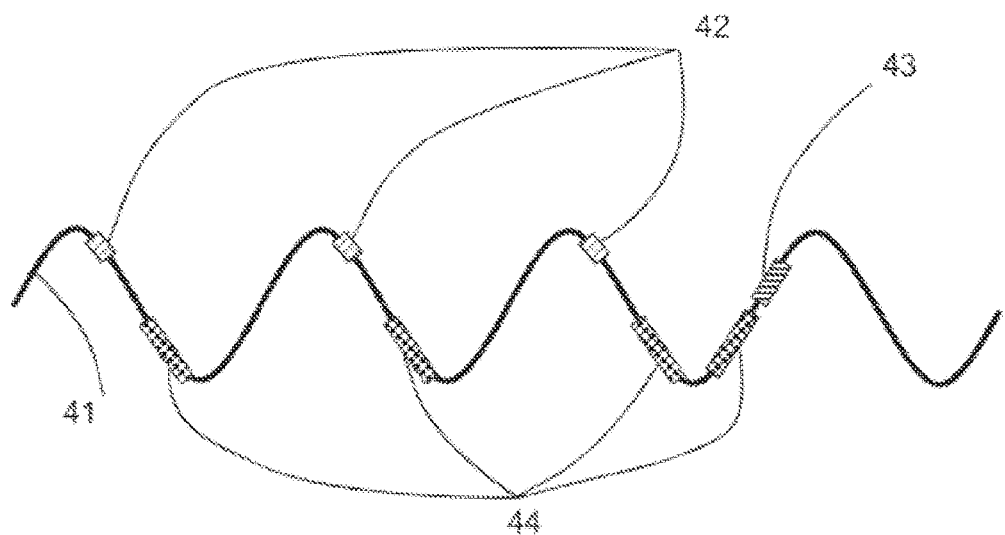
FIG. 4 illustrates the different length electron bunch train experiencing different accelerations and deaccelerations in the linac (linear accelerator).

An optimized MOPA FEL configuration can overcome the limitations of the OSC FEL. SASE FEL, and RAFEL configurations. While historically MOPA FEL configurations have been experimented with, they did not include the optimized configurations disclosed herein, nor the BNNT cryosorbers and/or BNNT vibration damper described herein. The MOPA FEL configuration utilizes two undulators where the optical beam from one undulator feeds the second undulator. In an example embodiment, an OSC undulator, an undulator known in the art used in oscillator-type FEL, can be used to create an optical beam that is fed into an AMP undulator. While separate electron accelerators can used to drive the two undulators, this is not required if two separate energy beams are run in one accelerator where the final two electron energies are tuned to have a tune energies that match the MOPA FEL lasing conditions separately for the two undulators. FIG. 4 illustrates a train of electron bunches experiencing acceleration in the electromagnetic fields 421 of the linac. In this embodiment three electron bunches 42 experience slightly more electric field than the fourth electron bunch 43. The cycle then repeats. The ratio of more accelerated electron bunches 42 to less accelerated electron bunches 43 can be changed, typically in the ratio of about 1:1 to about 1:10, but may be beyond this range. An additional feature illustrated in FIG. 4 is that the less accelerated electron bunches 43 are longer in space, and consequently in time, than the more accelerated bunches 42. This will help the subsequent optical beam bunches to having different lengths in time. A further feature, not illustrated, is that amount of charge in the bunches can be different, i.e. the more accelerated bunches 42 can have more, less or the same charge as the less accelerated bunches 43. Modern electron source technology can achieve these variations and multiple other embodiments are apparent to those skilled in the art and are thereby included in the considerations.

For the optimized MOPA FEL the electron beam is directed from the linac 314 (referring to the FIG. 3 embodiment) via a magnet beam line or arc 318 to the AMP undulator 39. In preferred embodiments, the electron beam may initially go to the AMP undulator 39, as this is where the greatest amount of optical power is generated and the electron beam needs minimal disturbance for optimal performance. Those electron bunches that have their energy tuned to the FEL conditions of the AMP undulator lase and produce the output optical beam 311 that then illuminates the beam director 312 to create the optical beam from the system 313. Following the AMP undulator, the electron beam is circulated back 314 to the OSC undulator 317 via a vertical dogleg 315 that raises or lowers the elevation of the electron beam and feeds it into the electron beam line 316 that feeds the OSC undulator. This changing elevation is labeled a PAPERCLIP MOPA FEL. In some embodiments the elevation 315 is not changed but this may not be optimal as the crossing beamlines in the same plane can create disturbances in the electron beam. The electron bunches 423 with tune energy for the OSC undulator 317 produce an optical beam 318 and 321 that resonates between the optical mirrors 319 and 320. The output mirror 320 extracts a fraction of the optical power in the OSC undulator 317 and this power is reflected by mirrors 322 into the AMP undulator 39. The electron beam in the OSC undulator 317 is directed back to the plane of the electron beam in the linac 314 by a vertical decline 323 and the return arc 324. The electron bunches then merge 313 with the electron bunches coming from the booster 312 to be subsequently deaccelerated in the linac 314, and then extracted by beam line elements 315 to enter 316 the beam stop 317. An alternative embodiment of the MOPA FEL is to have a single racetrack where the linac is followed by the AMP and OSC undulators and then the electron beam is brought back to the linac for energy recover of electron beam. While this geometry works, it has the disadvantage of having a larger footprint. PAPERCLIP very high average power MOPA FELs can be designed in detail to fit within a 10 m wide by 40 m long (IR). 55 m long (UV), 80 m (EUV) foot print or in some embodiments larger, while a racetrack MOPA FEL would need to be from 10 to 20 meters longer in most embodiments, and sometimes outside this range in some embodiments. As those of ordinary skill in FELs are aware, there is some flexibility in the overall MOPA FEL layouts but when configured to be very high average power, there are geometrical constraints on the beam lines transporting the electron beams such that the electron beams have the required properties when entering the undulators, linac and beam dump while minimizing the CSR and TR.

Figure 5:
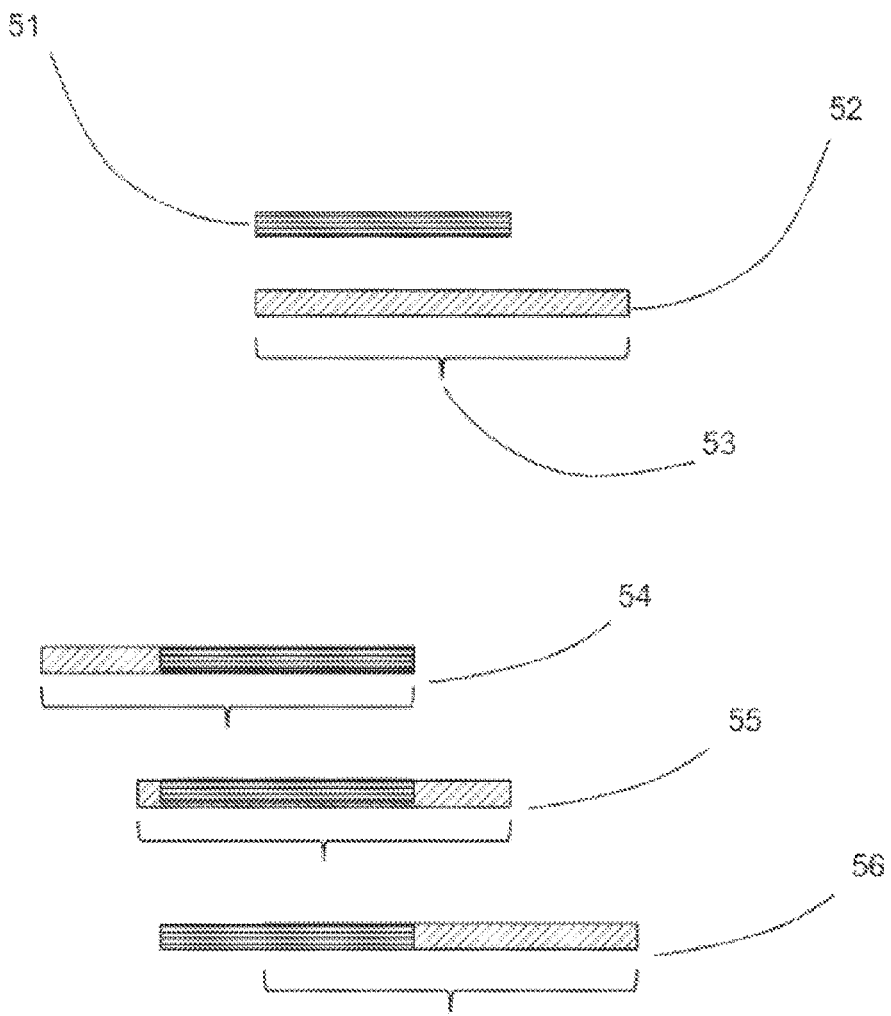
FIG. 5 illustrates the overlaps of the optical and electron beam bunches in the AMP undulator.

The importance of the different lengths of the electron bunches 42 and 43 is illustrated in FIG. 5 for the AMP undulator. The lengths of the electron bunch 51 and optical bunch 52 and 533 remain fixed. The optical bunch length 52 is set by the electron bunches in OSC undulator 317. The electron bunch length 51 in the AMP undulator 39 is set by the length of the electron bunches 42 that are tuned to the energy of the AMP undulator 39. When the electron 51 and optical bunches 52 enter the AMP undulator 317, at its upstream end 310, the leading edges of the two bunches 51 and 52 are the same 54. Midway in the AMP undulator 39 the leading edge of the optical bunch 52 is in front of the electron bunch 51. At the exit of the AMP undulator, the optical bunch 52 has slipped sufficiently along the electron bunch 51 that the overlap becomes insufficient to generate significant additional optical beam power in the optical beam 311.

One important consideration for the electron bunches entering the AMP undulator 39 is that they appropriately overlap in space and time with the photon bunches that are generated in the AMP undulator 39. This is achieved in the example embodiment by limiting the degradation of electron bunch quality and brightness by collective effects—including longitudinal space charge (LSC), coherent synchrotron radiation (CSR), and a related phenomenon which results from the interaction of statistical density fluctuations within the bunch through LSC and CSR, the microbunching instability, during formation, acceleration, and transport of the electron beam to both undulators. Recent advances in beam dynamics establish methods to assess the impact of, and to control, all such effects. If the transport design is not appropriately optimized such that these collective effects are mitigated the light output 313 of the AMP undulator 39 is greatly reduced.

In the OSC undulator 317 the length of the optical bunch is driven by the length of the electron bunch at that location in the overall MOPA FEL 30. An important consideration in both the OSC undulator 317 and the AMP undulator 39 is that the transverse dimensions the electron bunches and photon bunches are close to each other to optimize the lasing conversion of electron energy to photons.

Figure 6:
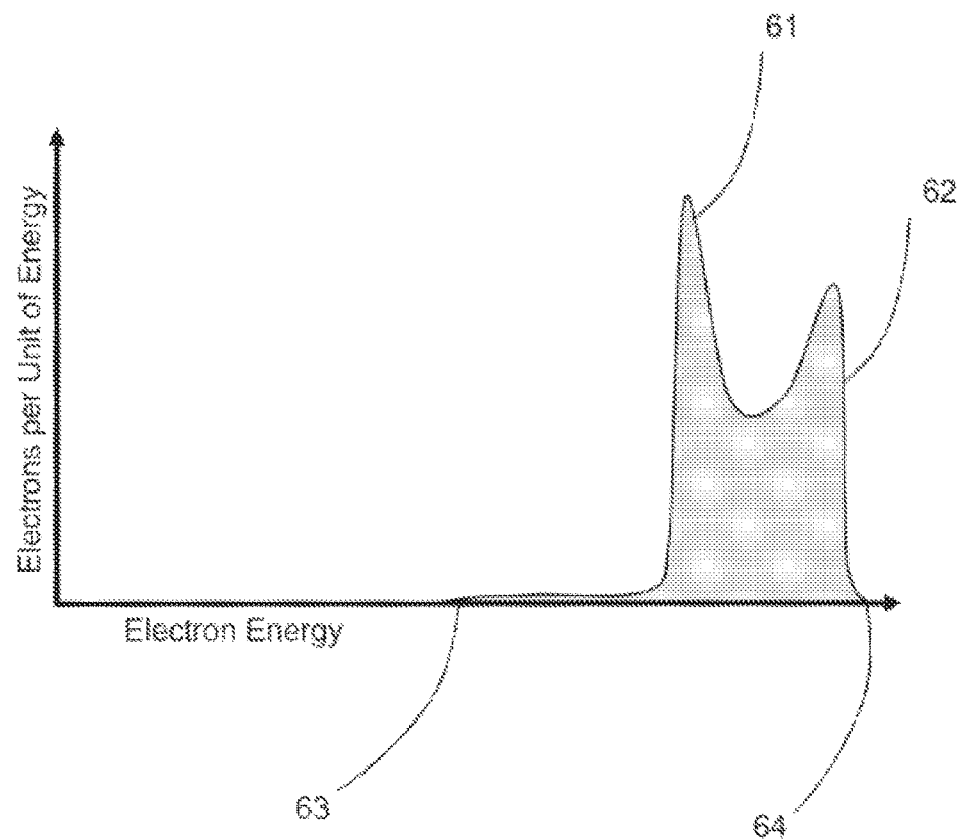
FIG. 6 illustrates the energy distribution of electrons following the AMP undulator.

At the exit of the AMP undulator 39 the portion of the electron beam with its initial energy set for the lasing conditions of the AMP undulator have an electron beam going into the return arc 314 with an energy distribution illustrated in FIG. 6. Approximately two-thirds of these electrons convert energy into the output beam 311 and end up with an energy 61, typically 2 to 10 percent below the energy 62 of the electron incident on the OSC undulator (e.g., that was tuned as discussed above), although the loss may be beyond this range in some embodiments. Approximately one-third of the electrons in this beam retain energies close to the energy entering the OSC undulator. Additionally, a small amount of electrons lose additional energy resulting in a tail 63 typically down to about 3 to about 5 times the energy difference between the peaks 61 and 62 but sometimes beyond this range, and additionally a small amount of electrons increase their energy to up to about 2 percent above 64 the ingoing electron beam energy. Small amount of electrons means typically less than about 5 percent of the incident electrons but it may sometimes be beyond this range.

Due to the energy spread of the electron bunches as illustrated in FIG. 6 the electron beam optics in the transport arcs 314 and 316 and possible elevation change 315 may be configured to transport the broad range of energies without generating levels of CSR that would degrade the beam quality going into the OSC undulator 317. Several options are available for the electron beam in the OSC undulator: 1) A fraction of the electron bunches, as discussed above, have an energy sufficiently separated from the electron beam tune energy of the AMP undulator 39, and this fraction drives the production of light in the OSC undulator. For a given undulator there is a range of electron beam energy that will produce lasing. For undulators and electron beam energies producing light in the EUV to IR the range or bandwidth of energies is typically from 1% to 0.01% of the electron beam energy though in some embodiments the range of energies may be broader. Sufficiently separated means that the tune energies of the AMP undulator 39 and the OSC undulator 317 must be separated by more than sum of the ranges of the two lasing energy widths of the two undulators. The fraction of electron bunches with their energy separated do not lase in the AMP undulator 39 but will lase in the OSC undulator 317, 2) The second option is to have all of the beam at the tune energy going into the AMP undulator 39 and use the approximately one-third portion of the electron beam that is minimally affected 62 by the AMP undulator 39 as illustrated in FIG. 6. The challenge is that while the average energy of this portion of the beam is still at the incident electron beam energy, it has been spread in energy and if the spread in energy is too high then it will not have sufficient electron current within the bandwidth or range required to lase in the OSC undulator 317. For a given embodiment, optimizing the choice between option 1) and 2) depends on the specific embodiment, and may be based on making a detailed analysis of the bandwidths, relative optical power levels selected in the AMP undulator 39 and OSC undulator. 3) A transverse acceleration or kick to the electron bunches tuned in frequency to apply differently to electron bunches going to the AMP undulator and OSC undulator can be provided by a RF separator system as those of ordinary skill in the art of transporting electron beam bunches. The kick can be adjusted so that one of the resulting trains of pulses lases in one undulator and the other train of pulses lases in the other undulator as those of ordinary skill in the art of lasing in FELs will be aware.

The AMP undulator 39 and OSC undulator 317 for embodiments of the MOPA FEL 30 may have a static spatially varying magnetic field characterized by an average variation length a and an average strength K. The value of 4 typically varies from about 1 mm to about 1 m but may fall outside of this range for some embodiments. For EUV to IR the value of $\lambda_\mu$ typically is in the range of 1 cm to 5 cm. The strength of K varies from 0.1 to about 3, but also may be outside of this range in some embodiments. The undulator magnetic field variation in most embodiments is arranged to be planar or helical. The AMP undulator 39 becomes a tapered undulator when for the length or a portion of the AMP undulator the value of $\lambda_\mu$ decreases or the value of K decreases, or both $\lambda_\mu$ and K decrease, or if $\lambda_\mu$ decreases and K increases, or if $\lambda_\mu$ increases and K decreases. The undulator equation is used to determine the parameters:

$$\lambda = \lambda_\mu (1+K^2/2)/2/\gamma^2$$

where $\lambda$ is the wavelength of the photon. $\lambda_\mu$ is the local undulator period length, K is the local dimensionless undulator magnetic field parameter, and $\gamma$ is the Lorentz factor of the electron. The slippage in the AMP undulator 39 of the electron bunch 51 relative to the photon bunch 52 as illustrated in FIG. 5 is impacted by the tapering. For example, undulators referred to a tapered undulators typically have the initial one-quarter to one-half of the tapered undulator actually not tapered as tapering is not as important when the electrons are losing relatively lower amount of energy in the initial stages of the undulator compared to the rate of energy loss in the latter stages of the undulator. The amount of tapering also impacts the energy distribution of the electron beam exiting the undulator as illustrated in FIG. 6.

When electron bunches 51 in the electron beam enter the undulator, the electrons experience transverse accelerations and consequently radiate photons that become the photon beams 311 and 321. Feedback between the electron distribution and the combined optical and magnetic field causes the electrons to bunch at the optical wavelength determined by a Lorentz contraction and a Doppler shift. Since bunches spaced at the optical wavelength are oscillating in synchrony the output becomes coherent, i.e. it is all of one phase and narrow in bandwidth. Typical embodiments have output wavelengths ranging from about EUV to IR, though the photon wavelength may be outside of this range for some embodiments. Typical embodiments may have photon bandwidths ranging from 0.0001% to 10%, though the bandwidth may be outside of this range for some embodiments. Efficient very high average power in the MOPA FEL 30 may be achieved by optimizing two competing conditions: shorter electron bunches generate higher peak currents, and consequently more photons. However, if the electron bunches are too short, the photons in photon bunches produced by the electron bunches are traveling at the speed of light and they get in front of the electron bunches. The electron bunches are traveling at slightly lower speed and more importantly, the electrons in the electron bunches are taking a longer path due the presence of the magnetic fields of the undulators 39 and 317 that affect the path length of electrons but do not affect the photons. As those of ordinary skill in FELs know, the length of the electron bunch is controlled by the length of the electron bunch coming out of the electron source 311, the RF fields in the booster 312 and accelerator 314, and the electron beam optical path of the electrons as they enter the AMP undulator 39 and OSC undulator 317. As those of ordinary skill should appreciate, the optimization of the competing conditions are different for high average photon beam power and high peak photon beam power. Typically, a detailed numerical simulation is useful for optimization of a specific embodiment.

After exiting the OSC undulator 317, the post undulator electron beam 324 is directed away from the photon beam 318. In some embodiments, this is performed by placing a magnet, not illustrated, that directs the post undulator electron beam to a beam dump, not illustrated that has sufficient material to create an electromagnetic shower and sufficient cooling to absorb the remaining electron beam energy. However, this embodiment is usually not preferred as it must deal with the significant electrical energy inefficiency and the nuclear radiation generated by the electromagnet shower from electrons that are above 10 MeV.

The preferred method of managing the post OSC undulator 317 electron beam is to redirect the spent electron beam as illustrated in FIG. 3 back to the linac 314 via an elevation adjusting beam line 323 and return arc 324 back to the merge 313. In this embodiment, the spent electron beam exiting the undulator 317 will have an energy spectrum ranging from up to about 2%, and in some embodiments higher that 2%, above the initial electron beam energy going into the OSC undulator 317 as illustrated in FIG. 6, to as low as five times the average energy loss of the beam in the OSC undulator 317. For example, if the average electron beam energy loss in the undulator is 10%, then some of the electron beam will have energy as low as 50%, or slightly more, below the incident electron beam energy. The MOPA FEL 30 arrangement shown in FIG. 3 is known by those of ordinary skill as an energy recovery linac (ERL) arrangement. The spent electron beam is injected back into the linac 314 via the merge elements 313 to achieve energy recovery. As the spent electron beam has a broad energy distribution that may be as much as 50% of the initial electron beam energy, the beam line elements in the final return arc 324 create a time energy correlation in the spent electron beam bunches such that when they arrive at the linac 314 the electrons with the highest (lowest) energy experience the maximum (minimum) deacceleration in the RF fields. The beam transport system returning the FEL exhaust beams to the linac for energy recovery are to be configured with specific choices of linear and nonlinear momentum compactions so as to establish—for each exhaust beam—the appropriate time-energy correlations necessary so as to insure each time slice of each beam is properly synchronized to the RF waveform such that the energy of each distinct time slice correlates to the decelerating gradient in the linac so as to compress the exhaust energy spread during energy recovery.

In preferred embodiments, the spent and now deaccelerated electron bunches exiting the linac 314 and being deflected into the beam stop 317 as described above need to be below the photo- or electro-neutron production threshold (near 10 MeV for most materials). Keeping these electrons below 10 MeV or slightly above this value in most embodiments minimizes the production of neutrons and consequently reduces the shielding requirements for the beam stop, sometimes called a beam dump, 317. The energy deposited in the beam dump can be converted to electrical power by letting the beam dump core temperate to raise to the 100° C.-1000° C. range, and in some embodiments above 1000° C. and converting the thermal energy to electric power. In some embodiments, the beam dump is partially a beam stop in that the beam passes through a copper cavity to extract some of the electron energy directly as RF power that is then returned to the linac 314 or booster 312. Consequently, beam stop technology can produce significantly reduced levels of radioactive materials as compared to beam dump technology and can be slightly more efficient due the direct conversion of spent electron bunch energy to RF power. Beam dump technology may be preferred in some embodiments but the issue of possible significant residual radioactivity should be addressed. Those of ordinary skill in the art should be familiar with assessing radioactivity for a particular embodiment.

High average power extraction in FELs requires high peak currents for the electron beam. Such high peak currents emit CSR radiation going around any bend of trajectory. CSR should be avoided or minimized when possible as it can adversely modify the length and energy distribution of the electrons in the electron bunches and in some embodiments remove sufficient power from the electron beam that supplemental thermal cooling of the beam line and its elements is required. However, some configurations require some bends to meet physical layout limitations and to provide proper control systems for control of the electron beam itself and the shape including length of the electron bunches as discussed above. In such situations, care should be exercised in the design of the bend to prevent the emitted CSR from feeding back on the electron beam and increasing its energy spread and decreasing transverse beam quality while at the same time decreasing the electron beam energy. As those of ordinary skill in the management of electron beams for FELs are aware, the generation transition radiation (TR) must also be considered. In an FEL TR can be generated whenever the electron bunches experience a change in the electrical fields typically from the image charges generated by currents flowing in the metal walls of the vacuum tubing surrounding the electron beam. For an efficient FEL, generation of TR needs to be minimized because it can diminish the energy and unfavorably distort the shape of the electron bunches. Additionally, TR can heat FEL components and thereby require the inefficiency of extra cooling and additional RF power to make up the energy loss. Usually the vacuum tubing diameters are kept as large as possible and transitions in diameters are made as long in length as possible to minimize the effects of TR, but spacings and diameters required for the undulators and SRF cavities place certain limitations on required distances. The MOPA FEL systems described herein are more efficient than prior FELs as they require significantly less average electron beam current to generate the required average beam power and consequently will generate less CSR and TR for a required amount of average photon beam power.

Figure 8:
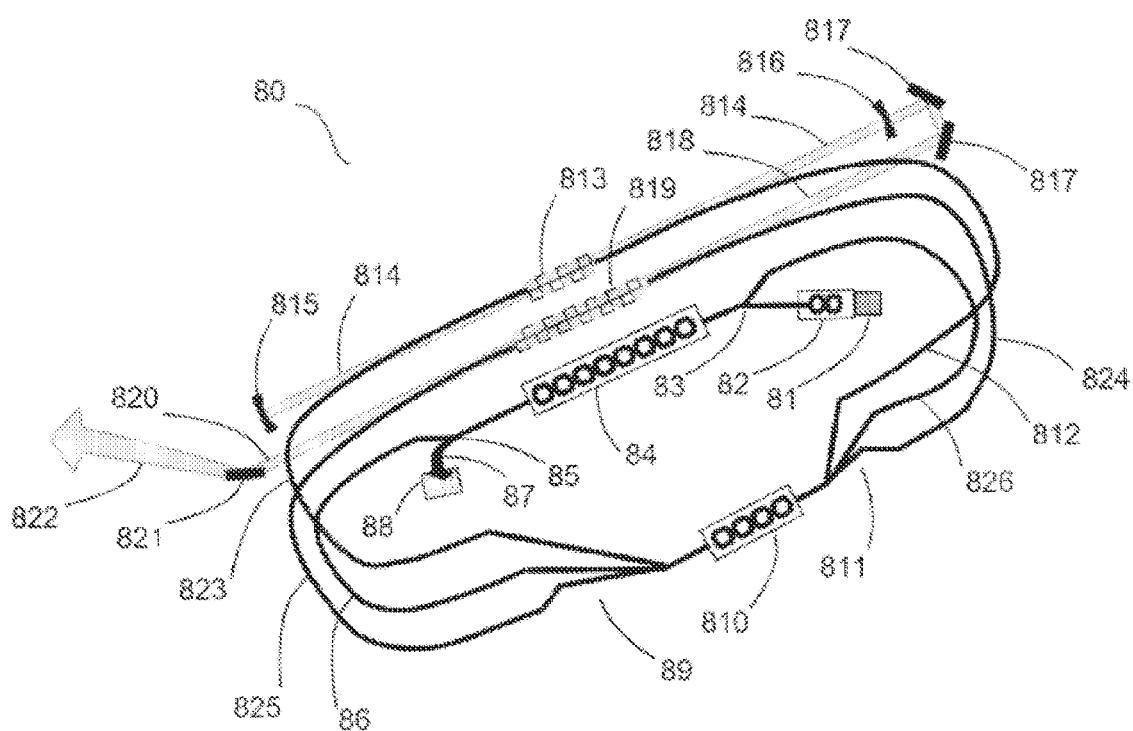
FIG. 8 illustrates an alternate embodiment of a MOPA FEL.
Figure 9:
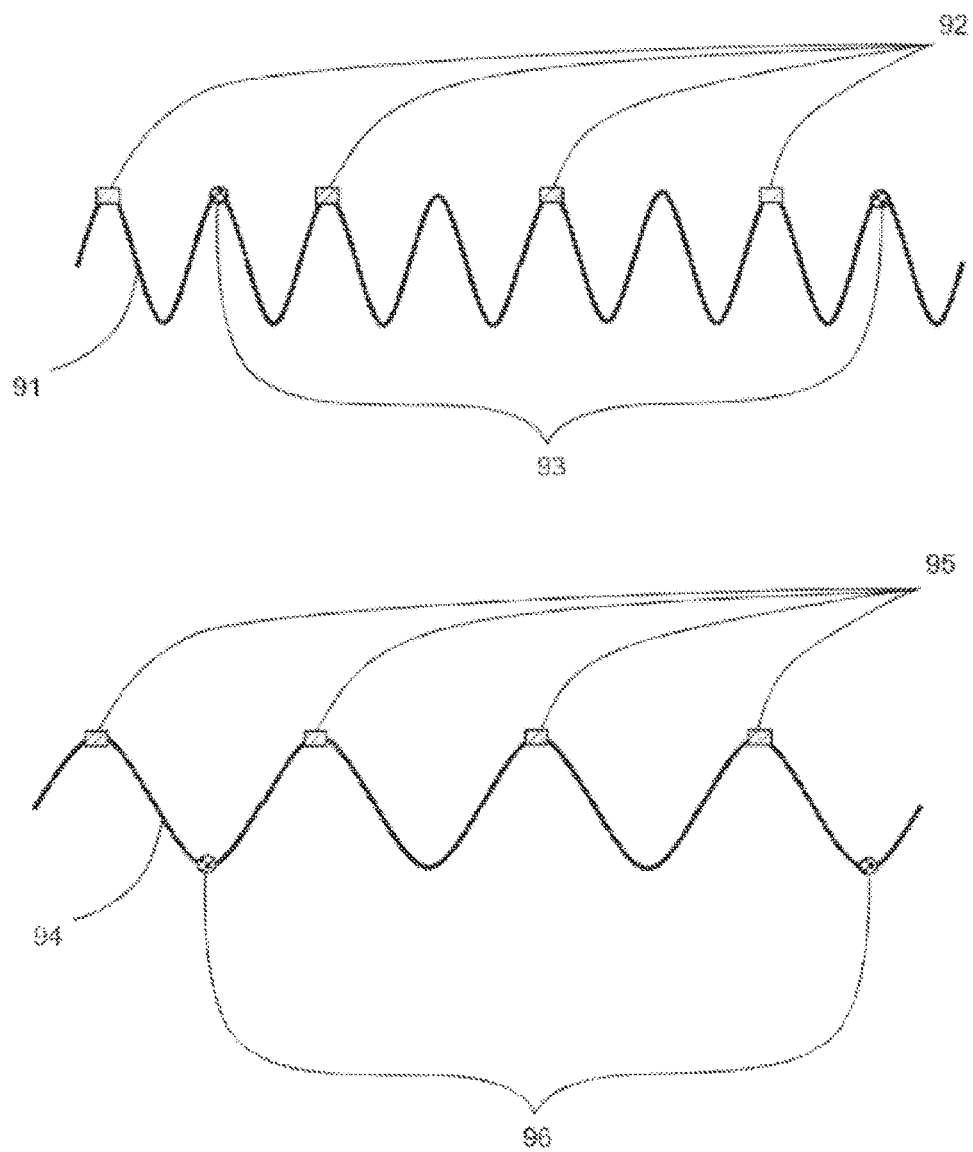
FIG. 9 illustrates the beam pulse pattern for the alternate embodiment.

FIG. 8 illustrates an embodiment of an MOPA FEL 80, to be referred to as a Compact MOPA FEL, according to an embodiment of the present approach. It should be appreciated that the Compact MOPA FEL may be used as an alternative to a PAPERCLIP MOPA FEL, such as the PAPERCLIP MOPA FEL 30 described in connection with FIG. 3, above. Embodiments of the Compact MOPA FEL 80 may include many of the elements and parameters described in connection with the PAPERCLIP MOPA FEL 30, such as, e.g., electron source 81, booster 82, beam merge 83, and accelerator (referred to as the Primary Accelerator (PA) 84 for the Compact MOPA FEL embodiment). A unique aspect of Compact MOPA FEL 80 is illustrated in FIG. 9. Taking fACC to represent the frequency of the accelerator 84, the electron source 81 and electron booster 82 generate two electron bunch trains, IAMP and IOSC, at maximum frequencies fAMPmax and fOSCmax where fAMPmax=fOSCmax=fACC/2. The frequencies of the IAMP and IACC electron bunch trains fAMP and fOSC may be any sub harmonic of fAMPmax and fOSCmax up to and including the frequencies fAMPmax and fOSCmax. FIG. 9 illustrates the electron bunches placed near the peaks of the accelerating field 91 in the accelerator 84 where in the example illustrated fAMP=fAMPmax and fOSC=fOSCmax/3 for the fAMP bunches 92 and the fOSC bunches 93 respectively. As discussed for the ODR, the electron bunch charges can be varied electron bunch to electron bunch including having bunches with no charge to create patterns in the flow of bunches, the average electron currents can be different for the two electron bunch trains, and the electron source can create frequency modulated variations in the source energy.

In the embodiment shown, the IAMP and IOSC beams exit the PA 84, are separated at beam splitter 85 from the spent beam 87, and are circulated to the combiner 89 via an arc 86. The combiner feeds the IAMP and IOSC beams into the Secondary Accelerator (SA) 810, where, as illustrated in FIG. 9, the TAMP electron bunches 95 are further accelerated and the IOSC electron bunches 96 are deaccelerated by the SA field 94.

Following the SA 810, the separator 811 takes the higher energy TAMP beam via a circulation arc 824 to the AMP undulator 819. AMP undulator 819 generates an output light beam 820, that may be directed by the output mirror 821 as an output FEL, beam 822. The spent IAMP beam from the AMP undulator 819 circulates via an arc 825 to the combiner 89. Following the SA 810, the separator 811 takes the lower energy IOSC beam via a circulation arc 812 to the OSC undulator 813. OSC undulator 813 emits light beam 814, reflected by mirrors 815, 816, and 817 to AMP undulator 819, where light beam 818 is amplified before emission from the FEL 822. The spent IOSDC beam from the OSC undulator 813 circulates via an arc 823 to the combiner 89. The time phase of the spent IAMP and spent IOSC beam are controlled by the lengths of the circulation arcs 823 and 825 so that they have a controlled phase relative to the accelerating/deaccelerating fields in the SA such that they emerge with their energies including their energy spreads within a band to separate into the circulation arc 826 on a path back to the PA for energy recovery as an ERL. If required, additional beam manipulation accelerating structures can be added independently on straight sections of individual arcs if this is determined to be beneficial to a given embodiment. As those of ordinary skill should appreciate, this novel arrangement of these phasing relationships can be achieved for control of the energies and energy spreads. Accordingly, embodiments of the Compact MOPA FEL provide high average output beams, and efficient energy recovery of the electron beams.

Both the IAMP and IOSC spent electron bunch trains for the Compact MOPA FEL 80 are energy recovered in the PA and beam stop 88 in a fashion similar to what was described above for the PAPERCLIP MOPA FEL 30. Similarly, for the Compact MOPA FEL 80, the optical beams from the OSC undulator 813 and AMP undulator 819 arc set up by the mirrors 815, 816 and 817 in the same fashion as the mirrors for the PAPERCLIP MOPA FEL 30. The energy spreads, control of pulse pattern and heterodyning are likewise similar. The advantages of the Compact MOPA FEL over the PAPERCLIP MOPA FEL include: the IAMP and IOSC electron bunch trains only pass through their respective undulators and do not have to pass through an additional undulator and arc which enables more efficient control of CSR and microbunching in the arcs and reduces spurious TR in the undulators; and, the layout can be designed to fit within a 6 m wide by 36 m long (IR) and possibly smaller which is significantly smaller.

As one of ordinary skill in the art should be aware, a prior limitation on the performance of FELs has been the efficiency on the conversion of average electron beam current to average photon beam power. As disclosed herein, this limitation is reduced by a factor of about 5 to about 20, and in some embodiments above this 20. By concurrently integrating multiple advances as a system, efficient very high average power MOPA FELs become feasible and may be employed under the present approach. The first advance is the development of high bunch charge/high brightness/high average current electron guns such as demonstrated at Cornell University where an electron source has demonstrated average currents of 65 mA with bunch charges of up to 100 pC and normalized emittances of less than or of the order of 0.3 mm-mrad. The Cornell electron source allows for a tradeoff where the bunch charge can be increased for a corresponding increase in emittance. The University of Wisconsin is also developing an electron source with similar electron beam properties that operates with RF directly on the cathode. The second advance is the realization a MOPA FEL that optimizes the balance of feeding photon beam energy from the OSC undulator 317 into the AMP undulator 39. This, in turn, implies that the overlap between the electron bunches and the optical field of the photon bunches is maintained over an extended distance as illustrated in FIG. 5, thereby increasing the extraction efficiency of the electron-to-optical energy transfer.

The third advance relates to improvements in the vacuum system associated with DC electron sources that use photocathodes. The lifetime of a photocathode required for a high quality FEL is limited by the quality of the vacuum around the photocathode. A new generation of cryopumps that utilize boron nitride nanotubes (BNNTs) as the pumping surface are anticipated to extend the lifetimes of photocathodes by a factor of three or more as described in U.S. Provisional Patent Application No. 62/427,583 (which is incorporated by reference in its entirety) and International Application PCT/US2017/063752, filed Nov. 29, 2017 (also incorporated by reference in its entirety). Using BNNTs as a cryosorber enables efficient cryopumps for use with FELs. The pumping capacity of the cryopumps can be further increased by utilizing BNNTs, and in particular BNNTs that have been purified. BNNT material purified as described in U.S. Provisional Patent Application No. 62/427,506 (which is incorporated by reference in its entirety) is an example of purified BNNTs, which are especially useful for the present approach. Purified BNNTs have a larger surface area per unit mass, contributing to the pumping speed and capacity enhancements.

The fourth advance is in reducing the mechanical vibrations of the SRF cavities. These vibrations result in length variations of the SRF cavities that must be compensated for by increasing the RF power supplied to the cavities. A factor of 10% to 50% reduction in the amount of RF power required can be achieved by reducing these vibrations. BNNTs are outstanding vibration dampers, and suitable for use in SRF cavities. For example, mats of purified and aligned BNNTs have viscoelastic properties with tan S greater than 0.1, and therefore can be utilized as passive vibration damping at cryogenic temperatures, as described in International Patent Application No. PCT/US2018/017231, filed Feb. 7, 2017 and incorporated by reference in its entirety. The viscoelastic performance of the boron nitride nanotube mats may be enhanced when the BNNT material is purified, as described above. The viscoelastic performance of the boron nitride nanotube mats may also be enhanced when the BNNT material is aligned as described in U.S. patent application Ser. No. 15/305,994, filed Oct. 21, 2016 and incorporated by reference in its entirety. In embodiments featuring a beam stop as described above, the water cooling for the heated copper cavities may be at high pressure (e.g., pressure ranging from 1 to 50 MPa) and mechanically connected to the SRF cavities in the accelerator and booster by RF waveguides. Rapidly flowing cooling water in these temperature ranges that feed electrical generation equipment produces mechanical vibrations. The viscoelastic properties of the BNNTs extend to the indicated temperature ranges as described in International Patent Application No. PCT/US2018/017231 (which is incorporated by reference in its entirety) and can be utilized to minimize the feedback of mechanical vibrations to the RF system that in turn connects to the SRF cavities. The result of the combined low temperature and high temperature mechanical vibration damping will result in a reduction of 10% to 50% and possibly beyond the range in the capital expense and operating expense for the RF power required.

The fifth advance is that SRF cavities with required levels of performance now operate at 4 K rather than 2 K. Previously, the resistive losses on the cavity walls (which scale as the gradient squared) were so high at 4 K operating temperature that only very low cavity gradients (~5 MV/m or less) could be utilized resulting in an unacceptably large accelerator. Advances in the surface treatment of niobium SRF cavities now result in quality factors exceeding $2^{10}$ at 2 K and $4^9$ at 4 K. This enable operation at gradients exceeding 8 MV/m at 4 K. In addition, substantial progress has been made in using other materials on the cavity surface (Nb3Sn and others) which have a natural capacity to operate at higher temperatures due to their higher critical temperature. Consequently, with either advance a helium refrigerator that operates at 4 K can be used. A 4 K refrigerator that meets the requirements has a capital and operating cost that is approximately a factor of two less than the 2 K refrigerator, along with a smaller size, mass, and higher reliability.

The sixth advance is the utilization of recently developed methods for the management of collective effects such that the quality and brightness of the electron bunches are preserved throughout the beam formation, acceleration, and transport process, such that the electron bunches entering the AMP undulator possess all properties appropriate for the production of extremely high photon pulse energy, with consequential high photon beam power.

The seventh advance is that two or more of the six preceding advances can be combined under the present approach in an integrated system optimized for the integrated performance of an efficient very high average power MOPA FEL. The preferred optimizations are dependent on the wavelength of the photon beam, the required average power of the photon beam, the optical properties of the photon beam, and the size of the layout of the MOPA FEL. As one of ordinary skill in the art of FELs is aware, for a given embodiment only some of the six advances may be utilized.

As illustrative examples, a PAPERCLIP MOPA FEL that operates IR output photon wavelength and utilizes all six advances is presented and compared to the Jefferson Lab FEL in the table below.

TABLE 1

Comparison of Contemporary FEL to MOPA FEL

| FEL | Jefferson Lab | MOPA FEL |
|---|---|---|
| Electron beam energy (MeV) | 150 | 110-150 |
| Average kW/mA | 1.4 | 10-40 |
| Undulator length (m) | 1.65 | 2 (OSC), 8 (AMP) |
| Undulator period (cm) | 5.5 | 3 |
| Change in AMP undulator amplitude K (%) | NA | 20-55* |
| Ratio of OSC to AMP photon beam power | NA | 5-15 |

*Note:
The range in undulator amplitude comes from the optimization of the photon output.

Figure 7:
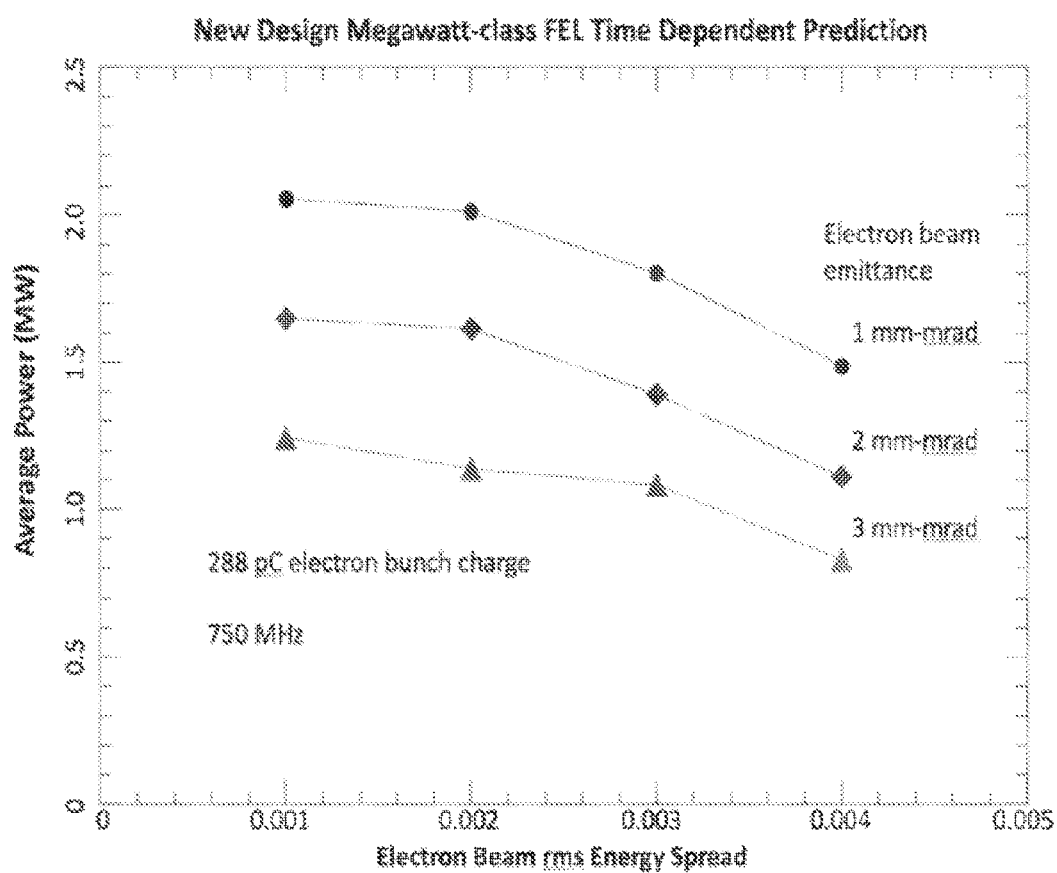
FIG. 7 illustrates megawatt-class performance over a range of parameters.

As is seen in the table above, the optimized MOPA FEL has significant performance enhancements over the prior best performance. This performance is further demonstrated in FIG. 7 where the results of time-dependent simulations using the MINERVA FEL code are shown. Megawatt-class performance is demonstrated over a range of parameters achievable by an optimized MOPA FEL. It should be appreciated that deviations from the disclosed embodiments may be made without departing from the present approach. For example, light beams may be redirected from tertiary mirror(s), such as in high altitude or in orbit. As another example, the target need not be limited to debris orbiting the planet. As a further example, the FEL may be airborne, or may be in space, in some embodiments. Those of ordinary skill in the art may adapt the present approach as needed.

As one of ordinary skill in the art of accelerator physics, free electron lasers and boron nitride nanotubes should appreciate, there is great flexibility in the detailed design of the accelerating subsystems, choices of: beam energy, beam current, undulator parameters, electron beam optics, refrigeration systems, vacuum systems, radio frequency sources and systems, vibration damping systems, control systems, and photon beam optics.

Embodiments of the present approach may include at least one computer with a user interface and a CPU running one or more algorithms and/or applications. For example, a computer may run a program having machine-readable program code for causing, when executed, the computer to perform steps, such as calculating orbital parameters as described above. It should be appreciated that algorithms are available in the art, for controlling light beam generation, focusing, and directing, and may be modified for use in embodiments of the present approach. Likewise, algorithms are available that may be modified for varying aspects of emitted light beams, such as light pulse patterns, and for detecting reflected light using the varied aspects to improve signal-to-noise ratio, and for determining orbital parameters and tracking identified OD. A person having ordinary skill in the art may also develop algorithms for performing aspects of the present approach, as such algorithms will depend heavily on the specific embodiment. The present approach is not limited to any particular algorithms for performing the calculations described herein, nor is the present approach limited to any particular CPU or controller(s).

The systems and methods described above are for example only, and may be implemented, in part, in any type of computer system or programming or processing environment, or in a computer program, alone or in conjunction with hardware. The present approach may also be implemented in software stored on a non-transitory computer-readable medium and executed as a computer program on a general purpose or special purpose computer. It should thus be understood that the present approach is not limited to any specific computer language, program, or computer.

The examples provided serve to guide the exposition of the concepts. The methods described in the present approach may be embodied in other specific forms without departing from the spirit or essential characteristics thereof. It should be appreciated that numerical values used herein may be approximate, and unless specifically stated, persons of ordinary skill in the art should appreciate that such values are generally not intended to be finite limitations or definitive values. The disclosed embodiments are therefore to be considered in all respects as illustrative and not restrictive by the foregoing description.

What is claimed is:

1. A master oscillator/power amplifier (MOPA) free electron laser (FEL) comprising:
    an electron source with an average electron beam current below about 2 mA and above 1 microamp per 10 kW of average photon beam power, the electron source having a normalized emittance less than 4 mm mrad and above 1 micro m mrad, an energy spread less than one part in one hundred,
    an electron booster,
    an electron accelerator,
    an OSC undulator having an output light beam path,
    an AMP undulator having an input light beam path connected to the OSC undulator output light beam path and an output emitted light beam path; and
    at least one of a boron nitride nanotube (BNNT) cryosorber and a BNNT vibration damper.

2. The MOPA FEL of claim 1, wherein the AMP undulator comprises one of a tapered undulator and a non-tapered undulator.

3. The MOPA FEL of claim 1, wherein at least one of the OSC undulator and the AMP undulator is a planar undulator.

4. The MOPA FEL of claim 1, wherein the AMP undulator comprises a planar undulator having a non-tapered portion.

5. The MOPA FEL of claim 1, wherein at least one of the OSC undulator and the AMP undulator comprises one of a planar undulator and a helical undulator.

6. The MOPA FEL of claim 1, further comprising SRF cavities having a boron nitride nanotube vibration damper.

7. The MOPA FEL of claim 1, further comprising an electron beam splitter with a first split electron beam arc connected to the AMP undulator and a second split electron beam arc connected to the OSC undulator, and an electron beam combiner after the AMP undulator and the OSC undulator with an output electron beam arc connected to a primary accelerator for energy recovery.

8. The MOPA FEL of claim 7, wherein the OSC undulator comprises an output light beam path and the AMP undulator comprises an input light beam path connected to the output light beam path.

9. The MOPA FEL of claim 1, wherein the AMP undulator comprises a non-tapered undulator.

10. The MOPA FEL of claim 1, further comprising an electron beam splitter with a first split electron beam arc connected to the AMP undulator and a second split electron beam arc connected to the OSC undulator, and a primary accelerator for energy recovery connected to the AMP undulator.

11. A master oscillator/power amplifier (MOPA) free electron laser (FEL) comprising:
    an electron source with an average electron beam current below about 2 mA and above 1 microamp per 10 kW of average photon beam power, the electron source having a normalized emittance less than 4 mm mrad and above 1 micro m mrad, an energy spread less than one part in one hundred,
    an electron booster,
    an electron accelerator,
    an OSC undulator having an output light beam path,
    an AMP undulator having an input light beam path connected to the OSC undulator output light beam path and an output emitted light beam path; and
    an electron beam splitter with a first split electron beam arc connected to the AMP undulator and a second split electron beam arc connected to the OSC undulator, and an electron beam combiner after the AMP undulator and the OSC undulator with an output electron beam arc connected to a primary accelerator for energy recovery.

12. The MOPA FEL of claim 11, further comprising at least one of a boron nitride nanotube (BNNT) cryosorber and a BNNT vibration damper.

13. A master oscillator/power amplifier (MOPA) free electron laser (FEL) comprising:
    an electron source with an average electron beam current below about 2 mA and above 1 microamp per 10 kW of average photon beam power, the electron source having a normalized emittance less than 4 mm mrad and above 1 micro m mrad, an energy spread less than one part in one hundred,
    an electron booster,
    an electron accelerator,
    an OSC undulator having an output light beam path,
    an AMP undulator having an input light beam path connected to the OSC undulator output light beam path and an output emitted light beam path; and
    an electron beam splitter with a first split electron beam arc connected to the AMP undulator and a second split electron beam arc connected to the OSC undulator, and a primary accelerator for energy recovery connected to the AMP undulator.

14. The MOPA FEL of claim 13, further comprising at least one of a boron nitride nanotube (BNNT) cryosorber and a BNNT vibration damper.

* * * * *